United States Patent
Branda et al.

(10) Patent No.: US 7,543,182 B2
(45) Date of Patent: Jun. 2, 2009

(54) AUTOMATED FAILOVER SYSTEM FOR LOGICAL PARTITIONS

(75) Inventors: Steven Joseph Branda, Rochester, MN (US); Matthew Ara Goshgarian, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 11/330,691

(22) Filed: Jan. 12, 2006

(65) Prior Publication Data

US 2007/0174361 A1 Jul. 26, 2007

(51) Int. Cl.
*G06F 11/00* (2006.01)
(52) U.S. Cl. .............................. 714/15; 714/2
(58) Field of Classification Search .............. 714/2, 714/15, 16, 38, 39; 717/124, 126, 128, 168
See application file for complete search history.

(56) References Cited

U.S. PATENT DOCUMENTS

| | | | |
|---|---|---|---|
| 6,199,179 B1 * | 3/2001 | Kauffman et al. ............. | 714/26 |
| 6,591,376 B1 * | 7/2003 | VanRooven et al. ........... | 714/36 |
| 6,598,174 B1 * | 7/2003 | Parks et al. .................... | 714/6 |
| 7,209,975 B1 * | 4/2007 | Zang et al. .................. | 709/238 |
| 2005/0036443 A1 * | 2/2005 | Collins ........................ | 370/216 |

* cited by examiner

*Primary Examiner*—Dieu-Minh Le
(74) *Attorney, Agent, or Firm*—Wood Herron & Evans LLP

(57) ABSTRACT

An apparatus, program product and method improve software updates processes within a logically partitioned environment by creating a new, proxy partition having substantially the same operating characteristics as an original partition, in addition to an updated software application. Network connectivity is transferred seamlessly over from the original partition to the new partition. While "hidden" from the network, the original partition continues to operate with reduced resources as the new partition takes over production operations. As such, the original partition remains in a ready state against the possibility of a problem arising with the new partition. In such an instance, network connectivity is transferred back over to the original partition, which resumes production operations as before.

18 Claims, 4 Drawing Sheets

AUTOMATED FAILOVER SYSTEM FOR LOGICAL PARTITIONS

FIELD OF THE INVENTION

The present invention relates to computing systems, and more particularly, to managing software updates within logically partitioned computer systems.

BACKGROUND OF THE INVENTION

Data migration refers generally to the processes of replacing or otherwise updating software within a computer operating environment. For instance, an operating system or server application may require updating in response to the release of a new software version. While necessary, data migration can pose a tremendous challenge and risk to businesses, government agencies and individuals that depend upon uninterrupted computer access. Too often, software installation problems occur. Such problems may be attributable to faulty program code or unforeseeable interactions within a processing environment. These problems can result in costly system errors and downtime.

Problems may be compounded in logically partitioned environments, where unique resource sharing and access practices may present additional considerations. Logical partitioning provides a programmed architecture suited for assigning and sharing computing assets. A partition may logically comprise a portion of a machine's physical processors, memory and other resources. As such, an administrator may allocate the same resources to more than one partition. Each partition may additionally host an operating system, in addition to multiple virtual processors. An underlying program called a hypervisor, or partition manager, assigns and dispatches physical processors to each virtual processor. Each partition conventionally has unique connections for communicating with a network. In this manner, each partition operates largely as if it is a separate computer.

To help minimize risks associated with software migration, system administrators conventionally test patches and other updates in separate, offline logical partitions. Because such tests are accomplished in isolated test environments, however, they often cannot reliably account for conditions and interactions that arise in actual operating environments. As such, risks associated with the integrity and compatibility of data migration processes persist.

Moreover, such conventional testing processes cannot help resolve problems that occur while in production. While some conventional applications can detect when a server fails, e.g., potentially due to a software migration application, any such detection is generally too late to avoid a crash or other functional problem. Any such problem stemming from an unsuccessful software upgrade can result in the loss of business and man hours. Such potential costs may further translate into a reluctance to install upgrades that would otherwise improve system performance.

There is consequently a need for an improved manner of accomplishing software migration within a logically partitioned environment.

SUMMARY OF THE INVENTION

The present invention provides an apparatus, method and program product configured to improve software migration in a logically partitioned environment. In one aspect, processes transfer network activity from a first logical partition having an original application to a second logical partition that has an updated application. After the transfer, the first logical partition is maintained in a ready state. If a condition indicative of undesirable performance is detected, then the system transfers the network activity from the second logical partition back to the first logical partition.

To promote management of the partitions, the first and second logical partitions may be logically associated with one another. The second partition may furthermore be created with the same external, network identification as the first partition to facilitate the transfer of network activity. Where the second logical partition is to be exposed to the network, the system may concurrently insulate the first partition from the network. While being maintained in this insulated, or hidden state, the first partition may be allocated a reduced amount of resources.

Conversely, where it desirable to transfer network activity back to the first partition, e.g., in response to the condition, then the system may insulate the second partition from the network source while concurrently exposing the first partition. The first partition may then resume network activity as before the implementation of the second partition. The user thus gets seamless failover in a manner that minimizes risks conventionally associated with software migration in a logically partitioned environment.

To most efficiently utilize resources, a full complement of resources may be reallocated to the first partition, and the second partition may be allocated a reduced amount. For instance, the second partition may be allocated resources sufficient enough to enable analysis of logs and other records on the second partition that reveal the nature of the condition.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
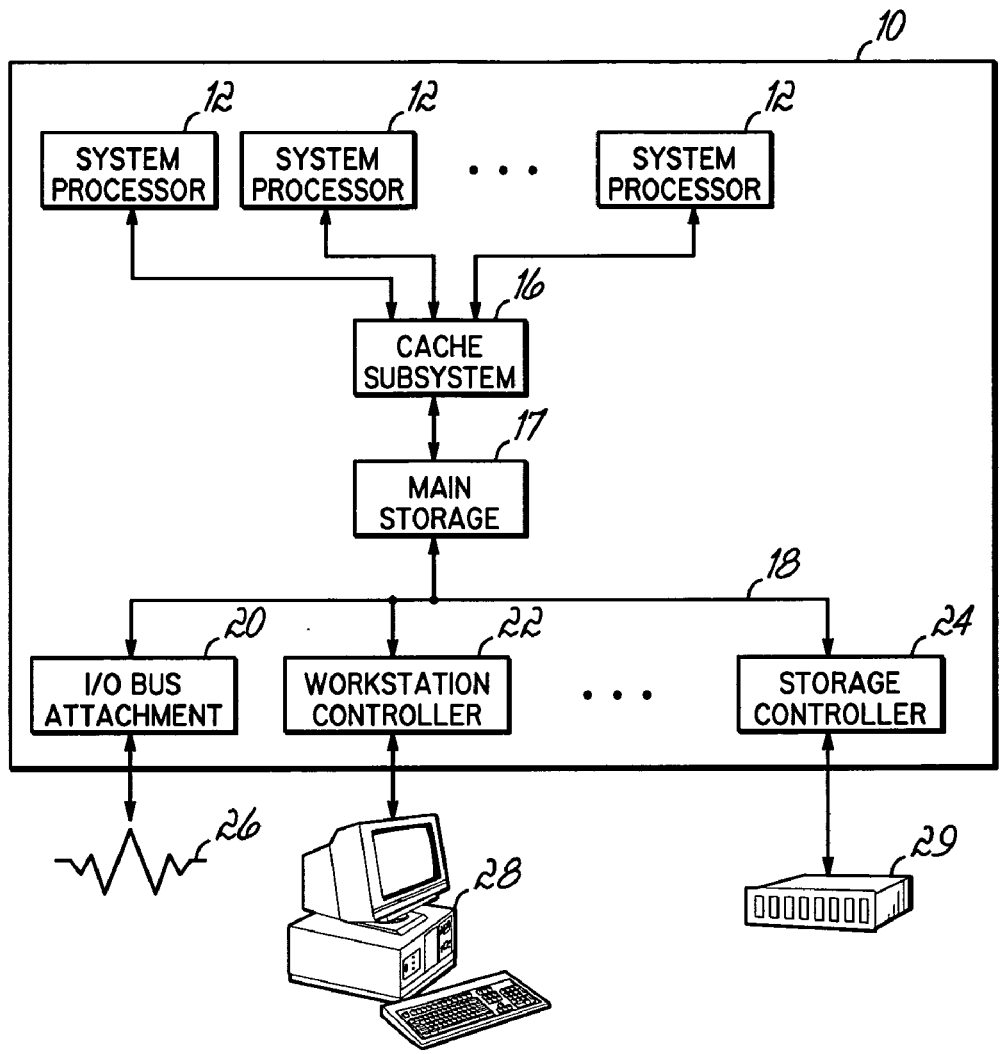
FIG. 1 is a block diagram of a computer system configured to accomplish a data migration operation in accordance with the principles of the present invention.

Features of the present invention include an apparatus, program product and method for minimizing risks associated with software migration in a logically partitioned environment. In an illustrative embodiment discussed below, for example, a system is provided in which software updates/migration processes are facilitated within a logically partitioned environment by creating a new, proxy partition having substantially the same operating characteristics as an original partition, in addition to an updated software application. Network connectivity is transferred seamlessly over from the original partition to the new partition. While "hidden" from the network, the original partition continues to operate with reduced resources as the new partition takes over production operations. As such, the original partition remains in a state of ready against the possibility of a problem arising with the new partition. In such an instance, network connectivity is transferred back over to the original partition, which resumes production operations as before.

To this end, the system described hereinafter may include program code inside of a logical partition that is used to partition the server. The code may function to seamlessly hide multiple logical partitions that are configured to appear as the same machine. The system selectively exposes one or more of these virtual machines to the network. The system effectively tricks the hidden machines into believing that they have functional network connections, so that an application, e.g., a WEBSPHERE application server, can sit idly on these hidden machines, ready to instantly take over functionality. The system may expose a simple interface that a customer can use to manually or automatically (i.e., using business rules or other automatic indicators) switch from the active logical partition to one of the hidden logical partitions. The system thus provides failover to a previous production setup.

Another aspect of the invention capitalizes on dynamic logical partition features to keep the hidden logical partitions active with a minimum of resources. In the embodiment discussed below, for example, a system maintains hidden logical partitions active with minimal resources, and increases these resources to production levels when failover occurs, so the logical partition can resume servicing requests. Since hidden logical partitions typically do not perform any useful work, the system can pull resources from the partition that failed when failover occurs, and give them back to the exposed, backup logical partition that has taken over the failed partition's workload. The logical partition on which the problem occurred is given a minimum amount of resources so that the log files and other records may be examined to determine what went wrong. Where customers are charged based upon resource usage, customers using dynamic logical partitions may be able to pay a minimum of overhead to maintain the old production logical partition for failover, yet still have a high quality of service in normal operation after failover.

Hardware and Software Environment

Turning more particularly to the drawings, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in another data processing apparatus, e.g., in stand-alone or single-user computer systems such as workstations, desktop computers, portable computers, and the like, or in other computing devices such as embedded controllers and the like. One suitable implementation of apparatus 10 may be a multi-user computer, such as an iSeries or pSeries computer available from International Business Machines Corporation.

Apparatus 10 generally includes one or more physical processors 12 coupled to a memory subsystem including main storage 17, e.g., an array of dynamic random access memory (DRAM). Where desired, the physical processors may be multithreaded. Also illustrated as interposed between physical processors 12 and main storage 17 is a cache subsystem 16, typically including one or more levels of data, instruction and/or combination caches, with certain caches either serving individual processors or multiple processors as is well known in the art.

Furthermore, main storage 17 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 29.

Figure 2:
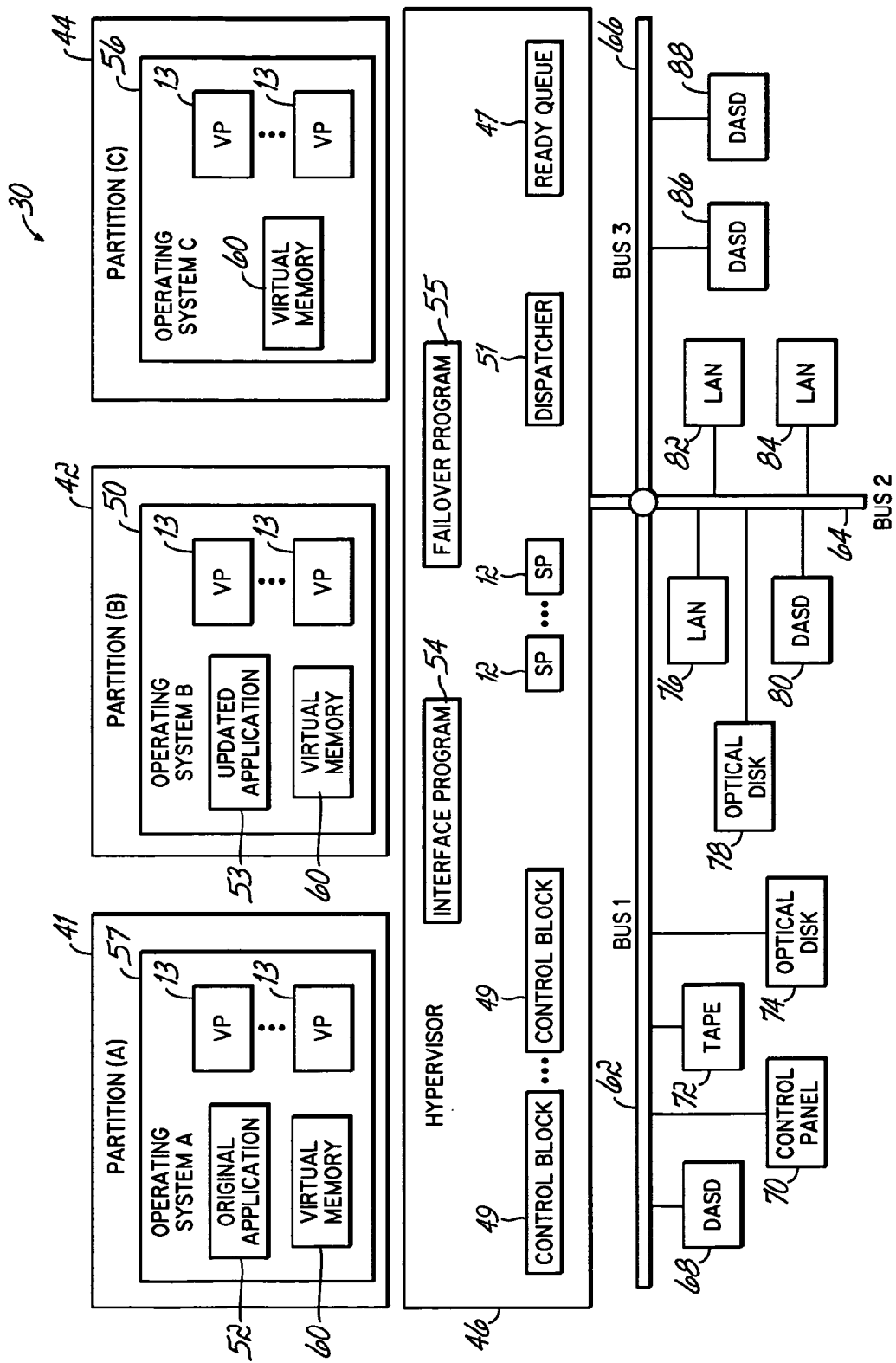
FIG. 2 is a block diagram of primary software components and resources consistent with the computer of FIG. 1.

FIG. 2 illustrates in greater detail the primary software components and resources used to implement a logically partitioned environment consistent in system 10 of FIG. 1. FIG. 2 generally shows a computing architecture characterized as a virtual machine design, developed by International Business Machines Corporation. The system 30 includes a plurality of partitions, e.g., partitions 41, 42 and 44 that share common processing resources among multiple processes. Such an architecture may rely upon a single computing machine having one or more physical processors 12, or central processing units (CPU's). The physical processors 12 may execute software configured to simulate multiple virtual processors 13.

The partitions 41, 42 and 44 may logically comprise a portion of a system's physical processors 12, memory 68 and other resources as assigned by an administrator. Each partition typically hosts an operating system 50, 56, 57 and may have multiple virtual processors 13. In this manner, each partition 41, 42 and 44 operates largely as if it is a separate computer.

As shown in FIG. 2, the production environment comprising each partition 41, 42 and 44 may also include program code, such as applications 52 and 53 shown in FIG. 2. While such applications may comprise virtually any program code, application 52 comprises an original, or existing application, and application 53 comprises a newer, or updated, application. An updated application may include a replacement application, e.g., a patch or newer version, or an altogether new application.

An underlying program called a hypervisor 46, or partition manager, uses this scheme to assign physical resources to each partition 41, 42 and 44. For instance, the hypervisor 46 may intercept requests for resources from operating systems 50, 56, 57 to globally share and allocate resources. If the partitions 41, 42 and 44 are sharing processors, the hypervisor 46 allocates physical processor cycles between the virtual processors 13 of the partitions 41, 42, 44 sharing the physical processor 12.

Each operating system 50, 56, 57 controls the primary operations of its respective logical partition 41, 42, 44 in the same manner as the operating system of a non-partitioned computer. Each logical partition 41, 42, 44 may execute in a separate memory space, represented by virtual memory 60. Moreover, each logical partition 41, 42, 44 is statically and/or dynamically allocated a portion of the available resources in apparatus 30. For example and as discussed herein, each logical partition may share one or more physical processors 12, as well as a portion of the available memory space for use in virtual memory 60. In this manner, a given processor may be utilized by more than one logical partition.

The hypervisor 46 may include a dispatcher 51 that manages the dispatching of virtual processors to physical processors on a dispatch list, or ready queue 47. The ready queue 47 comprises memory that includes a list of virtual processors having work that is waiting to be dispatched on a physical processor 12. The hypervisor 46 shown in FIG. 2 also includes physical processors 12, in addition to processor control blocks 49. The processor control blocks 49 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 may be implemented in a number of manners, including using various computer software applications, routines, components, programs, objects, modules, data structures, etc., referred to hereinafter as "computer programs," "tools," "programs" or "program code." Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 41, 42 and 44 (and operating systems), but has no user interface for the customer to protect it from failures that might otherwise come about through user interaction. Furthermore, while three logical partitions 41, 42 and 44 are shown in FIG. 2, one skilled in the art will appreciate that more or fewer partitions may be implemented as needed. Other alternative hardware and/or software environments may thus be used without departing from the scope of the invention.

Processes for Secondary Partition Setup and Failover

Figure 3:
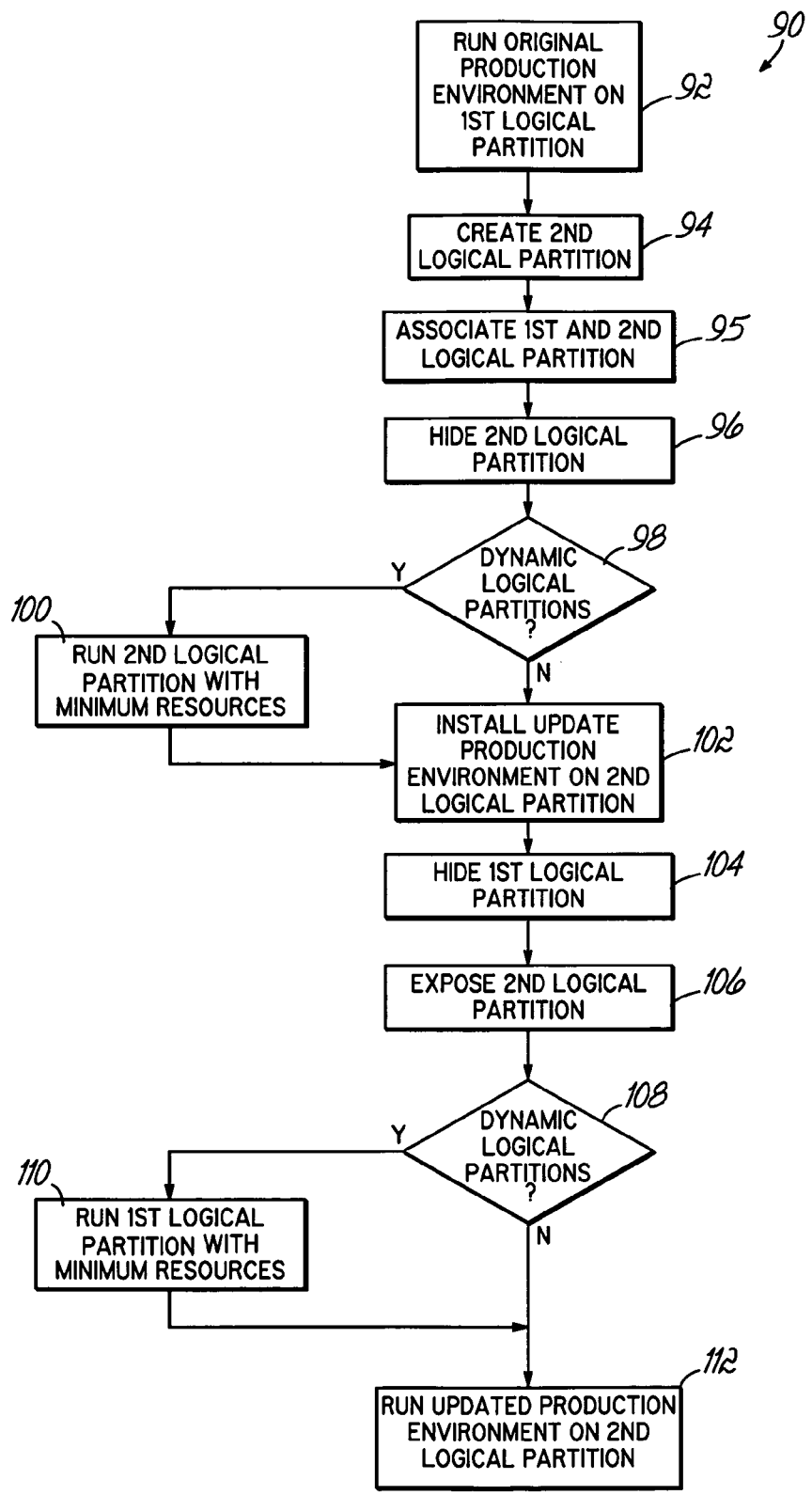
FIG. 3 is a flowchart having steps executable by the systems of FIG. 1 or 2 for setting up a failover arrangement between logical partitions during a migration operation.

FIG. 3 shows a flowchart 90 having a set of exemplary steps executable by the hardware and software systems of FIGS. 1 and 2 for generally accomplishing a software migration process. The steps of the flowchart 90 are more specifically directed to setting up a proxy, or backup, partition 42. Turning more particularly to the flowchart 90 of FIG. 3, a user's original production environment runs at block 92 on the first logical partition 41. That is, the user is already operating the original production environment and desires a new, patched or otherwise updated version of the production environment. In one example, the system 30 may require an updated version of a server software application 53 to replace an original application 52 (FIG. 2).

At blocks 94 and 95 of FIG. 3, the user may create the second logical partition 42 and associate it with the first logical partition 41. While the association of the partitions 41 and 42 may be done automatically in some embodiments, a user will typically access an interface program 54 (FIG. 2) that lists logical partitions and allows a user to create a new logical partition. This interface program 54 additionally allows the user to associate the logical partitions such that they share the same network address, card or any external interface viewable by the server. To facilitate the association, the logical partitions may be displayed in a list for the user, and the interface program 54 may include a wizard to create the association. In one example, a user may right-click on the name of a newly created logical partition to associate the original partition. This precaution avoids conflict by ensuring that both logical partitions are not exposed to the network 26.

The system 30, using any of the hypervisor 46, an operating system, or a Hardware Management Console (HMC), hides the second logical partition 42 at block 96. For instance, the system 30 keeps from network view any external identification associated with the second logical partition 42. As discussed herein, the hidden, second logical partition 42 has the same host name and Internet Protocol (IP) address as the first partition 41, which at this point is still exposed to the network 26.

The system determines at block 98 if the logical partitions 41, 42 are dynamic. Dynamic logical partitions allow users to reallocate CPU, I/O port and memory resources. If so, then the second logical partition 42 is run with minimal resources at block 100. This feature helps free up resources that might be needed by partitions actually receiving tasks from the network 26. If the logical partitions 41, 42 are not dynamic at block 98, then the user may choose to scale resources using known resource throttling techniques.

The user at block 102 may install the updated production environment on the second logical partition. As shown in FIG.

2, the second logical partition 42 has the updated application 53, e.g., a program patch, installed. While the second partition 42 is hidden from the network 26, the system 30 recreates the original production environment of the first partition 41 and applies the patch or other upgrade.

The system 30 may then hide the first logical partition 41 from the network 26 at block 104, and expose the second logical partition 42 at block 106. Since the partitions 41, 42 have the same network identifier, the system 30 may switch the applicable programmatic pointers such that the network 26 now communicates with the second logical partition 42. If the logical partitions 41, 42 are determined to be dynamic at block 108, then the system 30 will run the first logical partition 41 with minimal resources at block 110. That is, the system 30 may swap resources between the partitions 41, 42 such that the first logical partition 41 will have just enough resources so as to stay ready to become active again should the need arise. In any case, the system 30 will execute at block 112 the updated production environment on the second logical partition 42.

Figure 4:
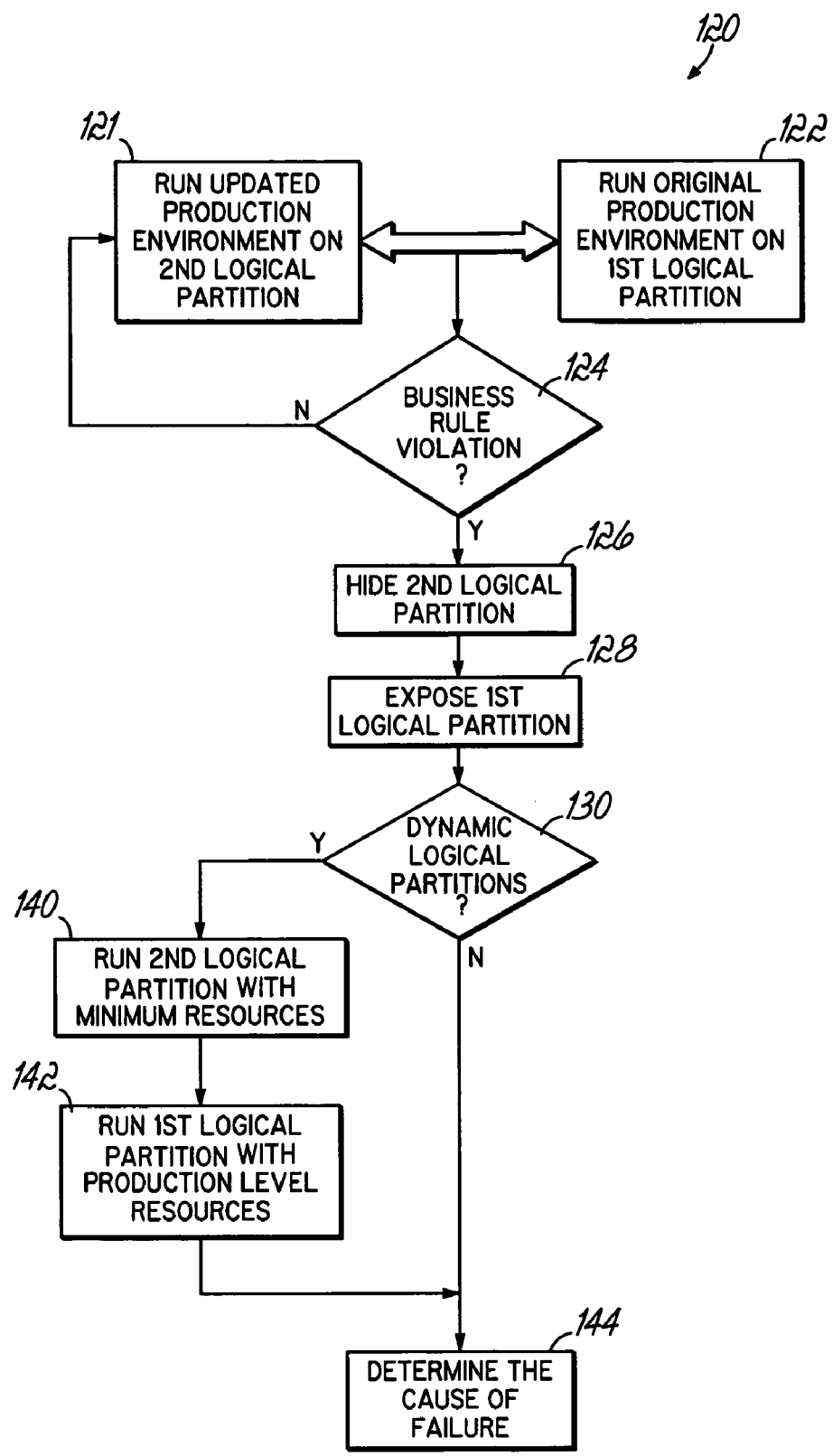
FIG. 4 is a flowchart having steps executable by the systems of FIG. 1 or 2 for accomplishing a failover operation between logical partitions in response to undesirable performance resulting from a migration operation.

FIG. 4 is a flowchart 120 having steps executable by the systems of FIG. 1 or 2 for accomplishing a failover operation between logical partitions 41, 42, e.g., as may be implemented in a failover program 55 (FIG. 2). The failover operation may be in response to undesirable performance resulting from the migration operation. The flowchart 120 generally shows process steps affecting failover operation as between the first, original partition 41 and a newly created, proxy partition 42. Creation of the new partition is described in the text accompanying FIG. 3.

At block 121 of FIG. 4, the updated production environment, e.g., updated application 53, runs on the second logical partition 42. Althoughbeit with minimal resources, the original production environment, e.g., original/existing application 52, may continue to run and/or be ready for instantaneous activation on the first logical partition 41, as shown by block 122.

The system 30 may detect at block 124 a system failure or other business rule violation. Exemplary business rules may include virtually any programmatic condition, e.g., an unexpected spike in CPU usage or a server failure. As such, the condition is generally indicative of undesirable performance attributable to the new partition environment. The logical partition and/or the operating system may determine the system crash or business rule violation at block 124. Alternatively or in addition, program code in the production environment/application 53, itself, may detect the rule violation.

In response to the detection of the business rule violation at block 124, the system 30 may revert back to the original operating environment, i.e., before the update. To this end, the system 30 may hide at block 126 the second logical partition 42. The system 30 may concurrently (or shortly thereafter) expose at block 128 the first logical partition 41. The controlling of the exposure of the first and second logical partitions may be accomplished automatically by the system 30. For instance, the logical partition subsystem comprising the HMC, virtual machine manager and/or an operating system may function to hide and expose the logical partitions as appropriate.

If the system 30 determines at block 130 that the logical partitions 41, 42 are dynamic logical partitions, then the system 30 will configure at block 140 the second logical partition 42 such that it runs with minimal resources. Allocation of these minimal resources may allow a user to perform diagnostic evaluations to determine why the updated application 53 failed. Conversely, the first logical partition 41 may run with production level resources at block 142 to handle the resumption of network tasking.

In any case, the cause of the system failure may be determined at block 144. For instance, a user may use special software tooling 54 to access the second logical partition 42 to view records. Alternatively, the system 10 may automatically generate a report from such records. As noted above, the records and minimal processes will remain supported. The first logical partition 41 thus resumes operations using the original production environment. That is, operation resumes just as before the switch to the updated production environment on the second logical partition 42.

In practice, a user may be currently running an application on, for example, Production Environment 6.0 and may wish to upgrade to Production Environment 6.01. The user installs new application Production Environment 6.01 on a separate logical partition, and keeps the logical partition with the current production, Production Environment 6.0, setup as is. The user manually associates the new, second logical partition (Production Environment 6.01) and the previous production logical partition (Production Environment 6.0) via a user interface. The second logical partition may have the same host name, IP and other external identifications as first logical partition, which is currently operating in the production environment.

Normally, running both logical partitions at once would cause a network collision. However, since features of the invention hide the old production setup, both logical partitions can run without a problem.

The user may define a business rule inside the software of the system that defines a condition for which network connectivity will revert back to the first partition. For instance, a business rule may mandate that if the application process dies unexpectedly, it should revert to the previous setup. When an unforeseen functional problem causes the Production Environment 6.01 server to crash, the system detects the business rule violation and switches over to the previous production logical partition, hiding, or insulating, the logical partition where Production Environment 6.01 is installed. Any transaction that was in the process at the time of the switch may automatically roll back due to the transactional facilities of an underlying database management system or transaction processing system. The previous production server is thus back on the real network, started up and ready to continue business as usual. The user thus gets seamless failover in a manner that minimizes risks conventionally associated with software migration in a logically partitioned environment. Moreover, administrators can examine logs and other failure information on the active, but hidden logical partition running Production Environment 6.01.

While the present invention has been illustrated by a description of various embodiments and while these embodiments have been described in considerable detail, it is not the intention of the applicants to restrict, or in any way limit, the scope of the appended claims to such detail. For instance, another embodiment supports clusters that comprise multiple logical partitions. Customers may run, for instance, a WEBSPHERE Application Server cluster on multiple logical partitions of the same server for reliability and vertical scaling benefits. The embodiment may supply functionality that allows users to manually identify certain logical partitions as part of a cluster. Users may then designate one cluster as the backup for another, causing the old production cluster to be hidden, while the new production cluster services requests on the network. The embodiment may also provide a private virtual network between logical partitions that belong to the hidden cluster so that the cluster members can communicate and stay in an idle, yet operational state, ready for failover at any time. Also, if a customer is using dynamic logical partitions, then the system may apply the resource management algorithm described above across a whole cluster group. When failover occurs, resources may then be pulled from the cluster that failed and given to the backup cluster so that it can service requests effectively.

As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of managing software migration within a logically partitioned environment, the method comprising:
    transferring network activity from a first logical partition including an original application to a second logical partition including an updated application;
    maintaining the first logical partition in a ready state after the transfer;
    detecting a condition indicative of undesirable performance; and
    transferring the network activity from the second logical partition back to the first logical partition in response to the condition;
wherein the method further comprises creating the second logical partition, installing the undated application in the second logical partition, and hiding the second logical partition from network activity, wherein transferring network activity from the first logical partition to the second logical partition includes hiding the first logical partition from network activity and exposing the second logical partition to network activity, and wherein transferring network activity from the second logical partition to the first logical partition includes hiding the second logical partition from network activity and exposing the first logical partition to network activity.

2. The method of claim 1, further comprising logically associating the first and second logical partitions with one another to preclude the first and second logical partitions from being simultaneously exposed to the network activity.

3. The method of claim 1, wherein maintaining the first logical partition in the ready state further comprises allocating a reduced amount of resources to the first logical partition.

4. The method of claim 1, wherein detecting the condition further comprises detecting a condition indicative of undesirable performance associated with the updated application.

5. The method of claim 1, wherein creating the second logical partition further comprises creating a network identifier for the second logical partition that is identical to a network identifier of the first partition such that only one of the first and second logical partitions may be exposed to network activity at any given time.

6. The method of claim 1, wherein transferring the network activity from the first logical partition to the second logical partition further includes insulating the first logical partition from a network source.

7. The method of claim 6, wherein transferring the network activity from the first logical partition to the second logical partition further includes exposing the second logical partition to a network source.

8. The method of claim 1, wherein transferring the network activity from the second logical partition back to the first logical partition further includes insulating the second logical partition from a network source.

9. The method of claim 8, wherein transferring the network activity from the second logical partition back to the first logical partition further includes exposing the first logical partition to a network source.

10. The method of claim 1, further comprising determining a cause of the condition.

11. An apparatus comprising:
    at least one processor;
    a first logical partition including an original application;
    a second logical partition including an updated application; and
    program code in communication with the first and second logical partitions and configured upon execution by the at least one processor to transfer network activity from the first logical partition to the second logical partition, to maintain the first logical partition in a ready state after the transfer, to detect a condition indicative of undesirable performance, and to transfer the network activity from the second logical partition back to the first logical partition in response to the condition;
wherein the program code is further configured to create the second logical partition, install the updated application in the second logical partition, and hide the second logical partition from network activity, wherein the program code is configured to transfer network activity from the first logical partition to the second logical partition by hiding the first logical partition from network activity and exposing the second logical partition to network activity, and wherein the program code is configured to transfer network activity from the second logical partition to the first logical partition by hiding the second logical partition from network activity and exposing the first logical partition to network activity.

12. The apparatus of claim 11, wherein the program code is further configured to logically associate the first and second logical partitions with one another to preclude the first and second logical partitions from being simultaneously exposed to the network activity.

13. The apparatus of claim 11, wherein the program code is configured to maintain the first logical partition in the ready state further by allocating a reduced amount of resources to the first logical partition.

14. The apparatus of claim 11, wherein the program code is configured to create the second logical partition further by creating a network identifier for the second logical partition that is identical to a network identifier of the first logical partition such that only one of the first and second logical partitions may be exposed to network activity at any given time.

15. A program product, comprising:
    a computer readable storage medium; and
    program code tangibly embodied on the computer readable storage medium and configured upon execution by at least one processor to transfer network activity from a first logical partition that includes an original application to a second logical partition that includes an updated application, to maintain the first logical partition in a ready state after the transfer, to detect a condition indicative of undesirable performance, and to transfer the network activity from the second logical partition back to the first logical partition in response to the condition;
wherein the program code is further configured to create the second logical partition, install the updated application in the second logical partition, and hide the second logical partition from network activity, wherein the program code is configured to transfer network activity from the first logical partition to the second logical partition by hiding the first logical partition from network activity and exposing the second logical partition to network activity, and wherein the program code is configured to transfer network activity from the second logical partition to the first logical partition by hiding the second logical partition from network activity and exposing the first logical partition to network activity.

16. The program product of claim 15, wherein the program code is further configured to logically associate the first and second logical partitions with one another to preclude the first and second logical partitions from being simultaneously exposed to the network activity.

17. The program product of claim 15, wherein the program code is configured to maintain the first logical partition in the ready state further by allocating a reduced amount of resources to the first logical partition.

18. The program product of claim 15, wherein the program code is configured to create the second logical partition further by creating a network identifier for the second logical partition that is identical to a network identifier of the first logical partition such that only one of the first and second logical partitions may be exposed to network activity at any given time.

* * * * *